(12) United States Patent
Fujinawa et al.

(10) Patent No.: US 7,865,280 B2
(45) Date of Patent: Jan. 4, 2011

(54) IMAGING APPARATUS AND DRIVE RECORDER SYSTEM

(75) Inventors: Nobuhiro Fujinawa, Yokohama (JP); Hirotake Nozaki, Port Washington, NY (US); Setsu Mitsuhashi, Tokyo (JP)

(73) Assignee: Nikon Corporation, Tokyo (JP)

( * ) Notice: Subject to any disclaimer, the term of this patent is extended or adjusted under 35 U.S.C. 154(b) by 619 days.

(21) Appl. No.: 11/919,930

(22) PCT Filed: Apr. 26, 2006

(86) PCT No.: PCT/JP2006/308770

§ 371 (c)(1),
(2), (4) Date: Dec. 13, 2007

(87) PCT Pub. No.: WO2006/120911

PCT Pub. Date: Nov. 16, 2006

(65) Prior Publication Data
US 2010/0100276 A1      Apr. 22, 2010

(30) Foreign Application Priority Data

May 9, 2005      (JP) .............................. 2005-136052

(51) Int. Cl.
*H04N 5/915*    (2006.01)
*B62D 41/00*    (2006.01)
*B60R 21/00*    (2006.01)
*H04N 5/225*    (2006.01)

(52) U.S. Cl. ............................ 701/35; 701/348; 369/21

(58) Field of Classification Search ........................ None
See application file for complete search history.

(56) References Cited

U.S. PATENT DOCUMENTS

| 6,076,026 | A  | * | 6/2000 | Jambhekar et al. ............ 701/35 |
| 6,211,907 | B1 | * | 4/2001 | Scaman et al. .............. 348/148 |
| 6,472,982 | B2 | * | 10/2002 | Eida et al. ................ 340/539.1 |
| 7,359,821 | B1 | * | 4/2008 | Smith et al. ................. 702/113 |
| 7,584,033 | B2 | * | 9/2009 | Mittelsteadt et al. .......... 701/35 |

(Continued)

FOREIGN PATENT DOCUMENTS

JP      A-09-123876      5/1997

(Continued)

OTHER PUBLICATIONS

Office Action issued in Japanese Patent Application No. 2006-122371 dispatched on Jul. 27, 2010 (w/English Translation).

*Primary Examiner*—Michael J. Zanelli
(74) *Attorney, Agent, or Firm*—Oliff & Berridge, PLC (57) ABSTRACT

An imaging apparatus mounted on a vehicle and imaging a vicinity of the vehicle, includes a photographic lens, an image pickup device, an accident detection sensor, an image processing section, and a recording section. The image pickup device generates an image signal by performing photoelectric conversion of an object image based on a light flux from the photographic lens. The accident detection sensor detects an accident occurrence based on a shock to the vehicle. The image processing section generates first accident image data and second accident image data which photograph the same accident situation at an accident occurrence, based on the image signal. The recording section records the first accident image data and the second accident image data in different states of security levels regarding data credibility, respectively.

7 Claims, 10 Drawing Sheets

U.S. PATENT DOCUMENTS

| | | | |
|---|---|---|---|
| 7,584,034 B2 * | 9/2009 | Kosugi | 701/35 |
| 2002/0145666 A1 * | 10/2002 | Scaman et al. | 348/148 |
| 2003/0028298 A1 * | 2/2003 | Macky et al. | 701/35 |
| 2003/0053536 A1 * | 3/2003 | Ebrami | 375/240.01 |
| 2004/0113763 A1 * | 6/2004 | Bendavid et al. | 340/436 |
| 2006/0208874 A1 * | 9/2006 | Chen | 340/539.1 |

FOREIGN PATENT DOCUMENTS

| | | |
|---|---|---|
| JP | A-2002-321664 | 11/2002 |
| JP | A-2003-063459 | 3/2003 |
| JP | A-2003-312553 | 11/2003 |
| JP | A-2004-352128 | 12/2004 |
| WO | WO 99/62741 | * 12/1999 |

* cited by examiner

IMAGING APPARATUS AND DRIVE RECORDER SYSTEM

CROSS-REFERENCE TO RELATED APPLICATION

This application is a U.S. National Stage application claiming the benefit of prior filed International Application Number PCT/JP2006/308770, filed Apr. 26, 2006, in which the International Application claims a priority date of May 9, 2005 based on prior filed Japanese Application Number 2005-136052 the entire contents of which are incorporated herein by reference.

TECHNICAL FIELD

The present invention relates to an imaging apparatus and a drive recorder system mounted on a vehicle for imaging and recording a vicinity of the vehicle at an accident.

BACKGROUND ART

Conventionally, there has been proposed a drive recorder which mounts a camera capable of photographing a moving image on a vehicle and records a picture at an accident. Image data in the drive recorder is digital data and has a feature of being easily edited with a computer. Therefore, there is also a possibility that fraudulence is committed cleverly by unit which modifies a picture of an accident by editing image data to be used for evidence. Hence, a drive recorder is disclosed in a patent Document 1, which encodes and records data to enhance credibility of image data as evidence.

While credibility of image data as evidence is enhanced according to the patent Document 1, no one but a specific person (public organization, insurance company, or the like), who has a decoding key can decode the image data, and therefore it becomes difficult for a driver personally to confirm contents of the image data. Also, back up image data is desired for maintaining image data more securely at an accident occurrence, but the patent Document 1 does not have such a consideration and there is a room to be improved.

Patent Document 1: Japanese Unexamined Patent Application Publication No. 2004-352128

DISCLOSURE

Problems to be Solved

The present invention is achieved for removing the drawback of the conventional technology, and an object thereof is to provide an imaging apparatus and a drive recorder system wherein high image data credibility as evidence and easiness for a driver personally to confirm contents thereof are realized at the same time and also maintainability of image data is improved.

Means for Solving the Problems

A first invention is an imaging apparatus mounted on a vehicle and imaging a vicinity of the vehicle, including a photographic lens, an image pickup device, an accident detection sensor, an image processing section, and a recording section. The image pickup device generates an image signal by performing photoelectric conversion of an object image based on a light flux from the photographic lens. The accident detection sensor detects an accident occurrence based on a shock to the vehicle. The image processing section generates first accident image data and second accident image data, which photograph the same accident situation at an accident occurrence, based on the image signal. The recording section records the first accident image data and the second accident image data in different states of security levels regarding data credibility, respectively.

A second invention is an imaging apparatus according to the first invention, in which the image processing section performs either an encoding process or an embedding process of a digital watermark data, on the first accident image data.

A third invention is an imaging apparatus according to the first or the second invention, in which the recording section includes: a first recording section recording the first accident image data in a setting to limit access from persons except for a specific person; and a second recording section logically and physically separated from the first recording section and recording the second accident image data in a setting with an access limitation relaxed from that of the first recording section.

A fourth invention is an imaging apparatus according to the third invention, in which the first recording section is fixed in the imaging apparatus and the second recording section is detachably connected to the imaging apparatus.

A fifth invention is an imaging apparatus according to the third or the fourth invention, in which the image processing section generates driving situation image data photographing a scene outside the vehicle under a predetermined condition, and records the driving situation image data in the second recording section.

A sixth invention is an imaging apparatus according to any one of the first to fifth inventions, further including a communication section transmitting to outside one accident image data with the security level set higher, out of the first accident image data and the second accident image data.

A seventh invention is an drive recorder system including an imaging apparatus according to any one of the first to sixth inventions, a driving state detecting section detecting a driving state of the vehicle and recording a driving state data representing the driving state in the recording section in association with at least one of the first accident image data and the second accident image data.

DETAILED DESCRIPTION OF THE EMBODIMENTS

Description of a First Embodiment

Figure 1:
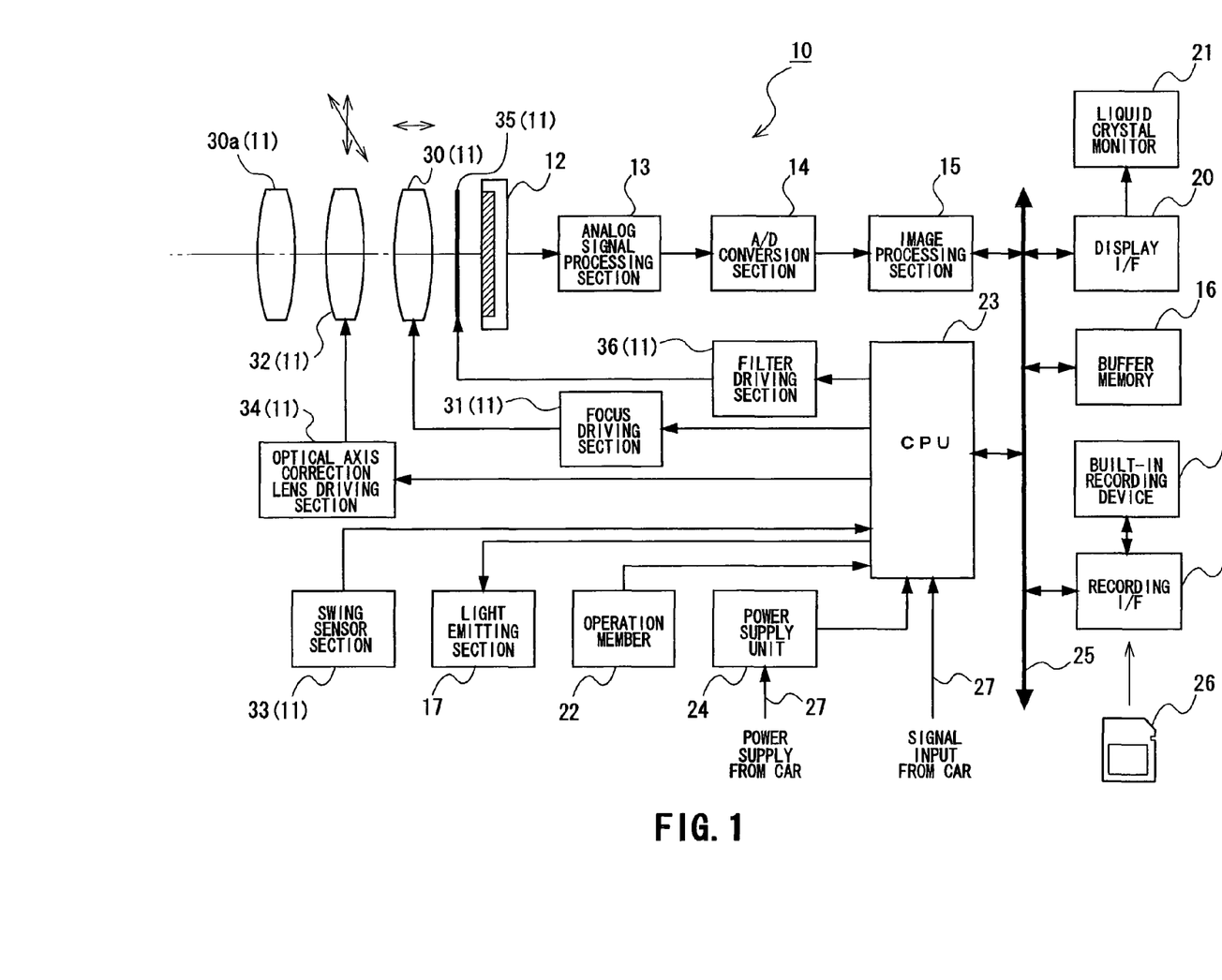
FIG. 1 is a block diagram showing a configuration of a drive recorder camera according to a first embodiment.
Figure 2:
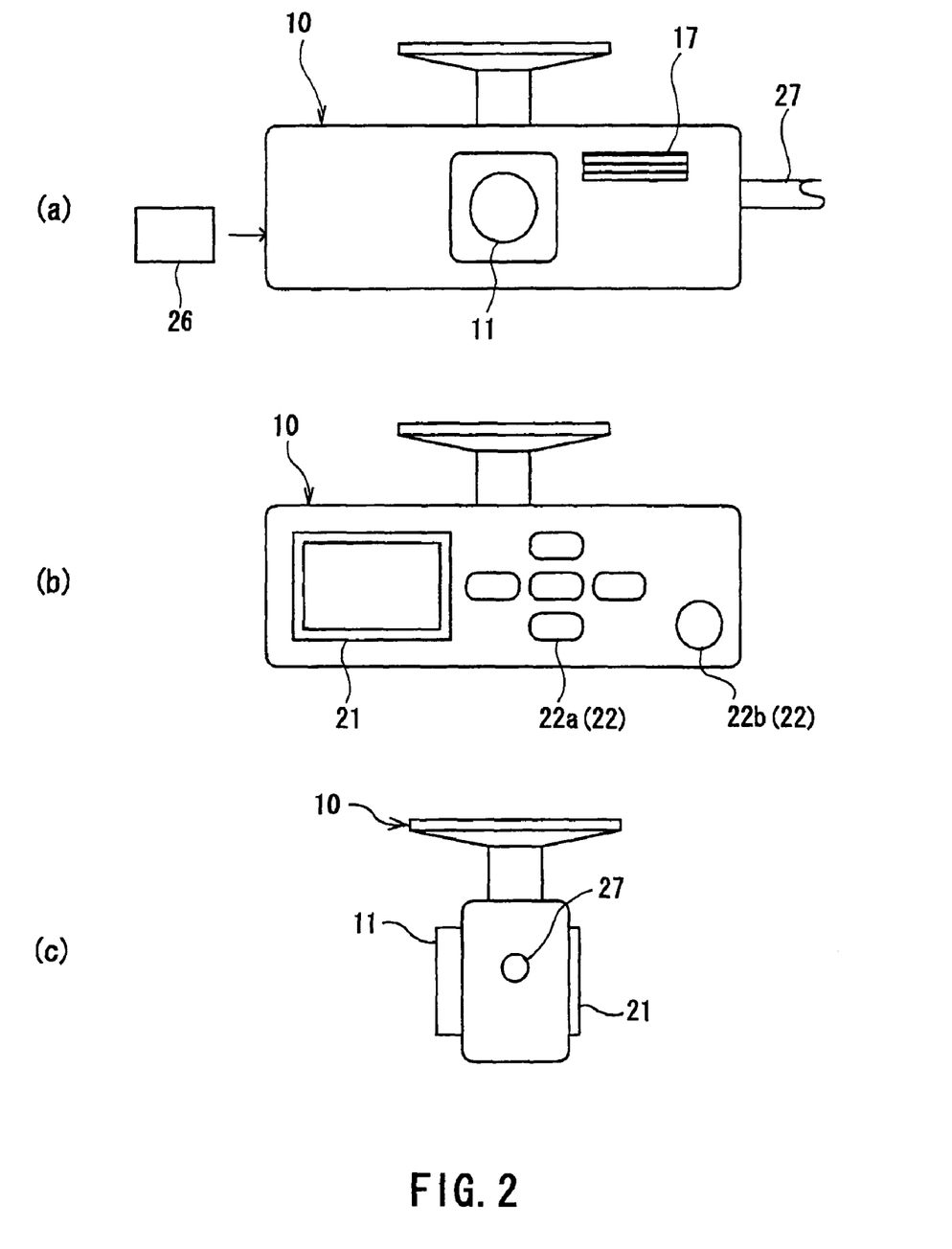
FIG. 2 is an appearance view of the drive recorder camera.
Figure 3:
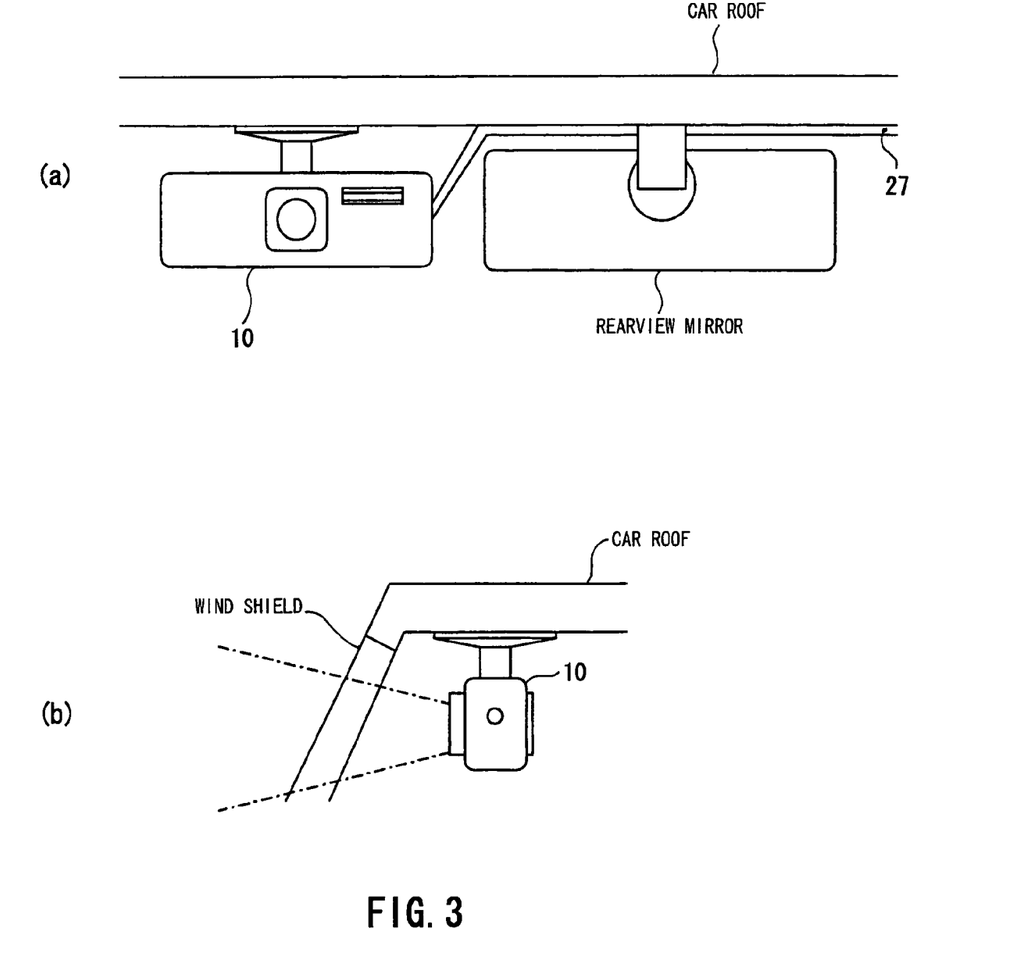
FIG. 3 is a diagram showing an attached state of the drive recorder camera.

FIG. 1 is a block diagram showing a configuration of a drive recorder camera according to a first embodiment. FIG. 2 is an appearance view of the drive recorder camera and FIG. 3 is a diagram showing an attached state of the drive recorder camera.

A drive recorder camera 10 according to the first embodiment is attached to a position in a car, from which an area including a viewing field ahead of a driver's seat can be photographed, (for example, near a rearview mirror in the car). Then, the drive recorder camera 10 can photograph an image around the car during car driving (refer to FIG. 3). As shown in FIG. 2A, a photographic optical system 11 and a light emitting section 17 are disposed on the front side of a housing of the drive recorder camera 10. Also, as shown in FIG. 2B, a liquid crystal monitor 21, and an operation switch 22a and a release button 22b forming an operation member 22 are disposed on the rear side of the housing of the drive recorder camera 10.

Further, as shown in FIG. 2C, a connector is provided for detachably connecting with a recording medium 26 (such as publicly known semiconductor memory and the like) on a side of the housing of the drive recorder camera 10. Still further, the drive recorder camera 10 is connected with a cable 27 for receiving various kinds of signal inputs and an electric power supply from the car.

As shown in FIG. 1, the drive recorder camera 10 includes a photographic optical system 11, an image pickup device 12, an analog signal processing section 13, an A/D conversion section 14, an image processing section 15, a buffer memory 16, a light emitting section 17, a recording I/F 18, a built-in recording device 19, a display I/F 20 and liquid crystal monitor 21, an operation member 22, a CPU 23, a power supply unit 24, and a data bus 25. Here, the image processing section 15, the buffer memory 16, the recoding I/F 18, the display I/F 20, and the CPU 23 are connected with each other via the data bus 25.

The photographic optical system 11 includes a focusing lens 30 for adjusting a focal point, a front lens 30a, a focus driving section 31, an optical axis correction lens 32, a swing sensor section 33, an optical-axis-correction-lens driving section 34, an infra-red cut filter 35, and a filter driving section 36.

The focus driving section 31 changes a position of the focusing lens 30 in the direction of an optical axis. The optical axis correction lens 32 is configured to be able to swing in a direction perpendicular to the optical axis. The swing sensor section 33 includes a vertical angular velocity sensor for sensing a vertical swing of the camera and a horizontal angular velocity sensor for sensing a horizontal swing of the camera. This swing sensor section 33 monitors a swing of the camera during car driving, and outputs camera swing data to the CPU 23. This camera swing data can be used for determining generation of accident image data as to be described hereinafter, other than for computing a shift amount of the optical axis correction lens 32. Here, when the camera swing data is used for determining generation of an accident image data, the swing sensor section 33 may be configured with sensors for an angular velocity around each of three axes perpendicular to each other and sensors for acceleration along each of three axes perpendicular to each other.

The optical-axis-correction-lens driving section 34 is constituted by a first driving section for swinging the optical axis correction lens 32 in a vertical swing direction (x direction) and a second driving section for swinging the optical axis correction lens in a horizontal swing direction (y direction). This optical-axis-correction-lens driving section 34 performs blur compensation by swinging the optical axis correction lens 32 according to an instruction of the CPU 23. The infra-red cut filter 35 cuts off an infra-red component from a light flux passing through the lenses. This infra-red cut filter 35 is configured to be able to retreat from a photographic light path by the filter driving section 36.

The image pickup device 12 is disposed on an image space side of the photographic optical system 11. On a light receiving surface of the image pickup device 12 (surface facing the photographic optical system 11), there are arranged light receiving elements in a matrix for generating an analog image signal by photoelectrically converting an object image. An output of this image pickup device 12 is connected to the analog signal processing section 13. Here, the image pickup device 12 may be either a sequential charge transfer type (CCD or the like) or an X-Y addressing type (CMOS or the like).

The analog signal processing section 13 includes a CDS circuit for performing a correlated double sampling, a gain circuit for amplifying an output of the analog image signal, a clamp circuit for clamping an input signal waveform to a certain voltage level, etc. The A/D conversion section 14 converts the analog image signal output from the analog signal processing section 13 into a digital image signal.

The image processing section 15 provides the digital image signal with an image processing (defective pixel compensation, gamma correction, interpolation, color conversion, edge enhancement, etc.) to generate image data (moving image data or still image data). Also, the image processing section 15 performs an image data compression processing and the like. The buffer memory 16 is configured with an SDRAM or the like. This buffer memory 16 stores temporarily an image data frame for the previous or the following step of an image processing in the image processing section 15.

The light emitting section 17 is formed by a xenon light bulb, a main capacitor for storing light emission energy, a light emission control circuit for controlling a light emission timing of the xenon light bulb according to an instruction of the CPU 23, etc. This light emitting section 17 emits light as needed in photographing a still image to illuminate an object by a flashing light.

The recording I/F 18 is connected with a connector of the recording medium 26 and the built-in recording device 19. Then, the recording I/F 18 controls reading and writing data from and into the recording medium 26 and the built-in recording device 19. Here, the built-in recording device 19 is formed by, for example, a recording device using such as a magnetic disk like a hard-disk, an optical disk, and a magneto-optical disk, a semiconductor memory, or the like.

In the first embodiment, each of moving image data and still image data representing a situation at an accident occurrence (accident image data) is recorded in both of the recording medium 26 and the built-in recording device 19.

The display I/F 20 is connected with the liquid crystal monitor 21. On the liquid crystal monitor 21, there are displayed a reproduced image of image data output from the recording I/F 18, a setting screen for changing various settings of the camera, etc. The operation switch 22a in the operation member 22 is used for such as an input operation at the setting screen. The release button 22b in the operation member 22 is used when a user instructs the CPU 23 to photograph at an accident occurrence and the like.

The CPU 23 controls each part of the drive recorder camera 10 according to a sequence program stored in a ROM (not shown in the drawing). Then, during car driving, the CPU 23 makes the image pickup device 12 photograph a viewing field ahead of a driver's seat and makes the image processing section 15 generate moving image data.

Also, the CPU 23 is connected with a switch group provided at each part of the car (not shown in the drawing) via a cable 27, and can detect an accident occurrence of the car or a state of a brake based on input signals from the switch group. Then, the CPU 23 makes the image processing section 15 generate still image data other than moving image data when having detected an accident.

The CPU 23 carries out other control functions described in the following (1) to (4).

(1) The CPU 23 carries out an AE calculation or the like based on an image signal from the image pickup device 12. Here, in an AE calculation of the first embodiment, the CPU 23 preferably carries out the AE calculation based on an image signal from a lower side of a screen and does not use an image signal from an upper side of the screen for the AE calculation. The reason is as follows.

Figure 4:
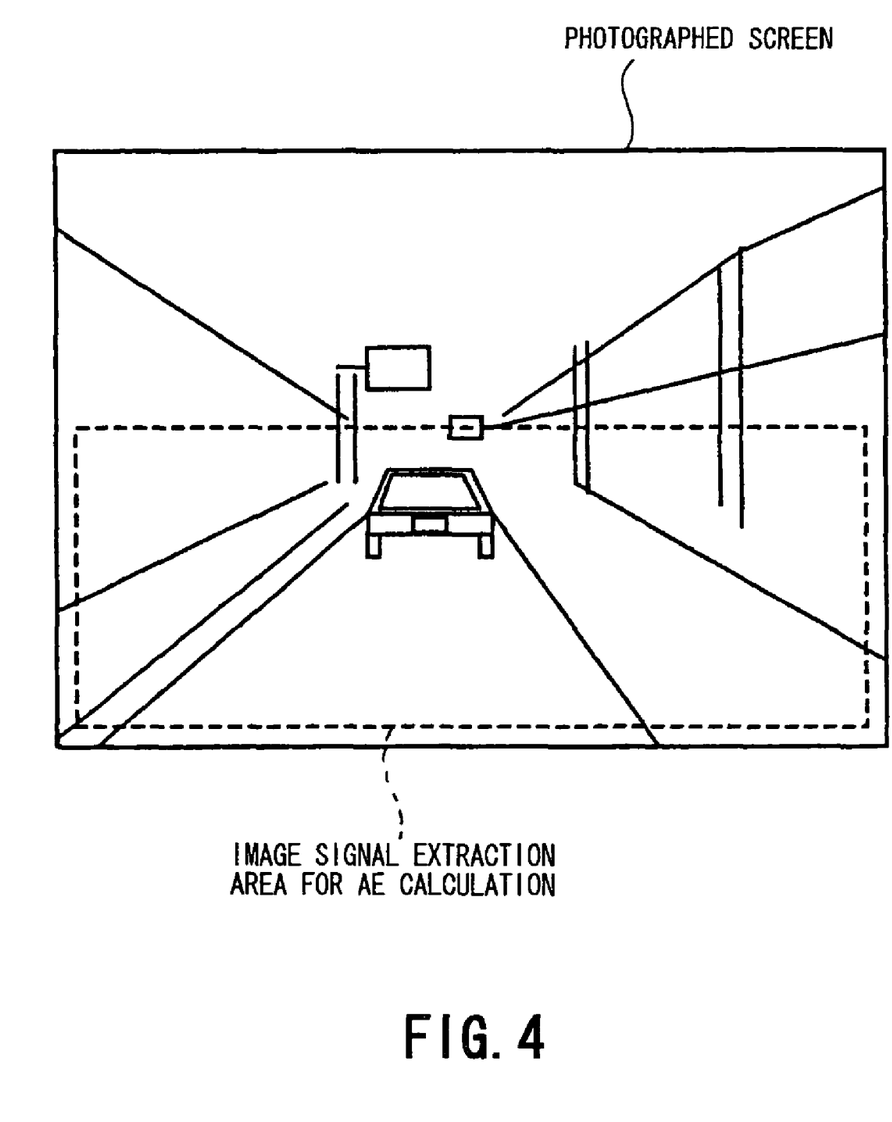
FIG. 4 is an explanatory diagram of an AE calculation in the drive recorder camera.

As shown in FIG. 4, generally, an photographed image by the drive recorder camera 10 frequently has an composition in which an important object such as a road, a car, a pedestrian, etc. is located in a area of a lower half from a center of a photographed screen and an upper half of the photographed screen is occupied by the sky. In this case, when an AE calculation is carried out using an image signal of a whole photographed screen, there is a case where an exposure of a whole image is adjusted to an under side by an influence of a bright sky. As a result, the important object in the lower half area of the image sinks in the dark. Particularly in photographing against the sun, the tendency becomes further outstanding. Therefore, as shown in FIG. 4, the CPU 23 carries out an AE calculation based on an image signal from a lower side of an image, resulting in that an exposure of the lower side of the screen becomes appropriate, though an exposure of the sky in the upper side of the screen goes slightly on an over side. Here, it becomes possible to photograph an image with which an accident situation is easily grasped.

(2) The CPU 23 calculates a contrast value of an object from an image signal and makes the focus driving section 31 perform an AF control by adjusting a position of the focus lens 30 in the direction of the optical axis in a manner of mountain climbing.

(3) The CPU 23 calculates correction amounts of the optical axis correction lens 32 in the x and y directions based on camera swing data, and carries out the blur compensation by outputting these correction amounts to the optical-axis-correction-lens driving section 34.

(4) The CPU 23 can change a position of the infra-red cut filter 35 by controlling the filter driving section 36 according to a time of a built-in clock (not shown in the drawing), a brightness of a photographed image, etc. Specifically, the CPU 23 disposes the infra-red cut filter 35 on the photographic light path for removing an influence of an infra-red component of the sun light in the daytime. On the other hand, at night or in a tunnel, the CPU 23 makes the infra-red cut filter 35 retreat from the photographic light path and improves an identification capability of a person and the like in an image by utilizing the infra-red component.

(5) The CPU 23 performs an "encoding process" or an "embedding-process of a digital watermark data" on image data to enhance a security level (difficulty of alteration) regarding image data credibility. Here, in the "encoding process," the CPU 23 evaluates the image data using a hash function, which is a one-way function, and encodes a hash value, which is an evaluated result, using a secret key according to a public key cryptosystem. Image data after the above process can be decoded only by a specific person (e.g., public organization, insurance company, or the like) who has a predetermined public key and the encoded image data is considered to have an extremely lower probability of being altered.

Also, in the "embedding process of a digital watermark data", the CPU 23 embeds digital watermark data in image data with a durability as low as providing little effect to image quality according to a predetermined rule. If any image edition is performed on such image data, the digital watermark data changes and existence of alteration in image data after the above process can be easily identified in reference to the digital watermark data.

(6) The CPU 23 limits browsing and reading of image data in the built-in recording device 19 for a specific person (e.g., public organization, insurance company, or the like) with a publicly known authenticating means such as a password input. In this case, persons except for a specified person authenticated by a password or the like can not access image data in the built-in recording device 19. Therefore, image data in the built-in recording device 19 has a lower probability of being altered.

(7) The CPU 23 photographs a viewing field ahead of a driving seat at predetermined intervals and can make the image processing section 15 generate still image data representing a driving situation (driving situation image data). This driving situation image data may be used for driver's labor management in a commercial car, for example. Here, in a case a GPS (Global Positioning System) device is mounted on a car, the CPU 23 may preferably obtain positional information at photographing from the GPS device via the cable 27, and record the positional information in association with still image data (the GPS device is omitted to be shown in FIG. 1).

The power supply unit 24 is connected with a car battery via the cable 27. Within the power supply unit 24, there is provided a rechargeable battery charged with electric power supplied from the car, and electric power is supplied to each part of the camera from the rechargeable battery (here, electric power lines except for that to the CPU 23 are omitted in the drawing). Therefore, the drive recorder camera 10 can operate continuously with electric power form the rechargeable battery in the power supply unit 24, even when the electric power supply from the car is cut off at an accident.

Figure 5:
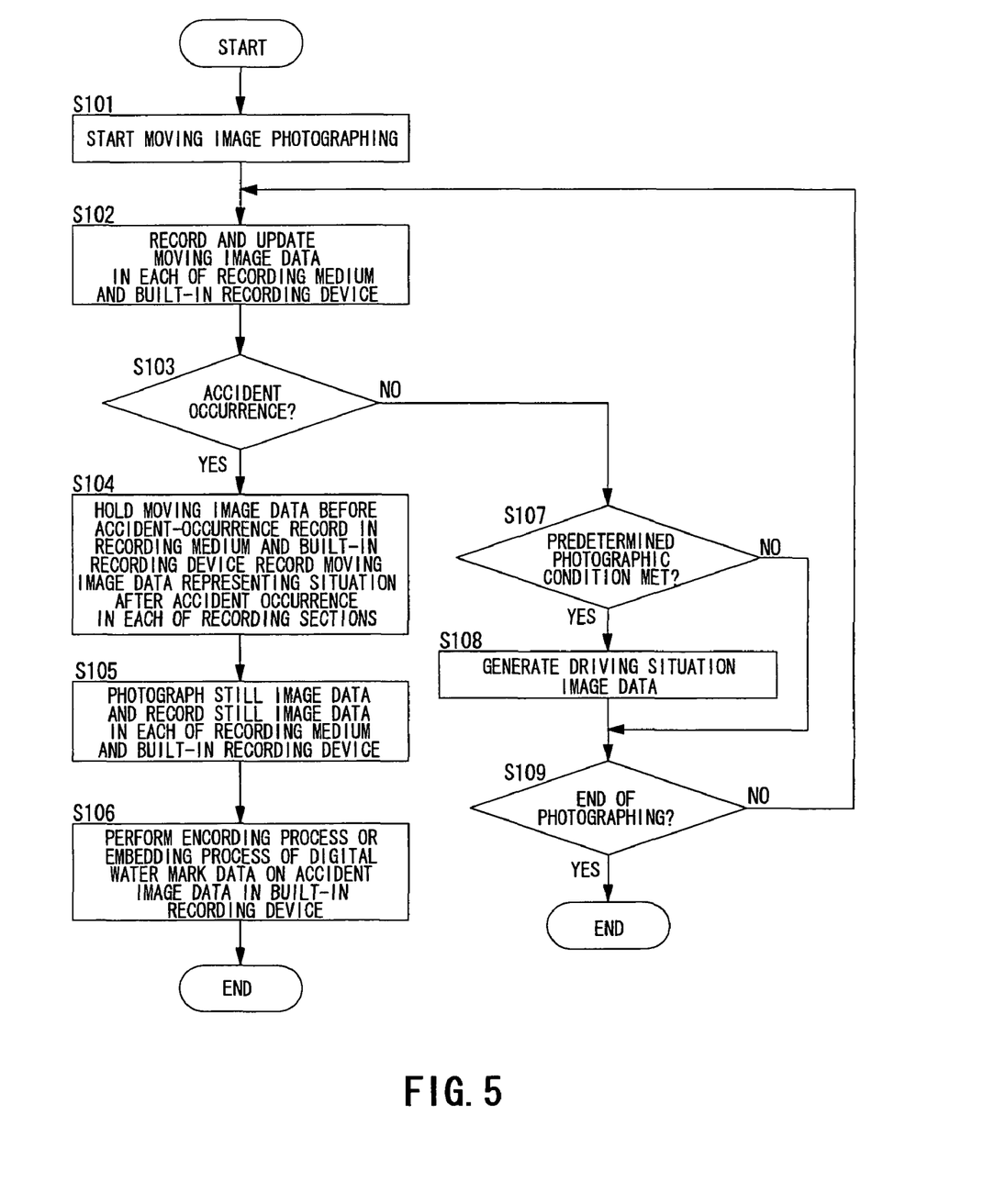
FIG. 5 is a flow chart of an operation of the drive recorder camera according to the first embodiment.

Hereinbelow, an operation of the drive recorder camera according to the first embodiment will be described in reference to the flow chart of FIG. 5.

Step S101: The CPU 23 starts photographing a moving image by detecting a car driving state (for example, engine start, wheel rotation, or the like), or by an input of photographing start by a user.

Step S102: The CPU 23 drives the image pickup device 12 to photograph an image of a viewing field ahead of a driver's seat. Then, the image processing section 15 generates moving image data at a predetermined frame rate (e.g., 15 fps or 30 fps) based on the image signal from the image pickup device 12. Then, the CPU 23 records the moving image data in both of the recording medium 26 and the built-in recording device 19. Here, moving image data recorded in S102 is overwritten in order from oldest data-after a certain time has elapsed, and moving image data is held for a certain time period in the drive recorder camera 10, while being updated sequentially.

Here, the moving image data is generated for the purpose of grasping a rough movement or a relative change in a whole image. Therefore, the CPU 23 generates moving image data by using at least any one of the following settings (1) to (3).

(1) The CPU 23 sets a resolution of moving image data lower than a resolution in a case where all the pixels of the image pickup device 12 are read out. For example, in a case where the number of pixels of an effective pixel area in the image pickup device 12 is 1,600×1,200, the CPU 23 sets the resolution of moving image data to be 640×480 pixels or 320×240 pixels. Thereby, a higher speed signal reading from the image pickup device 12 and a less computational load on the image processing section 15 can be realized by the pixel skipping readout. Also, since a data amount of moving image data becomes smaller, it becomes possible to make longer a recording time of the moving image data.

(2) The CPU 23 sets a gradation number of moving image data to be smaller than that of still image data. For example, in a case where the drive recorder camera 10 can photograph a still image with a color of eight bits for each R, G, and B, the CPU 23 sets a gradation number of moving image data to be five bits for each R, G, and B. In the above setting example, a data amount of moving image data is reduced to 15 bits (about two bytes) per pixel, while a data amount of still image data is 24 bits (tree bytes) per pixel. Therefore, the above setting suppresses a computation load on the image processing section 15 and a data amount of moving image data. Here, a monochrome photographing for moving image data further can reduce the data amount.

Figure 6:
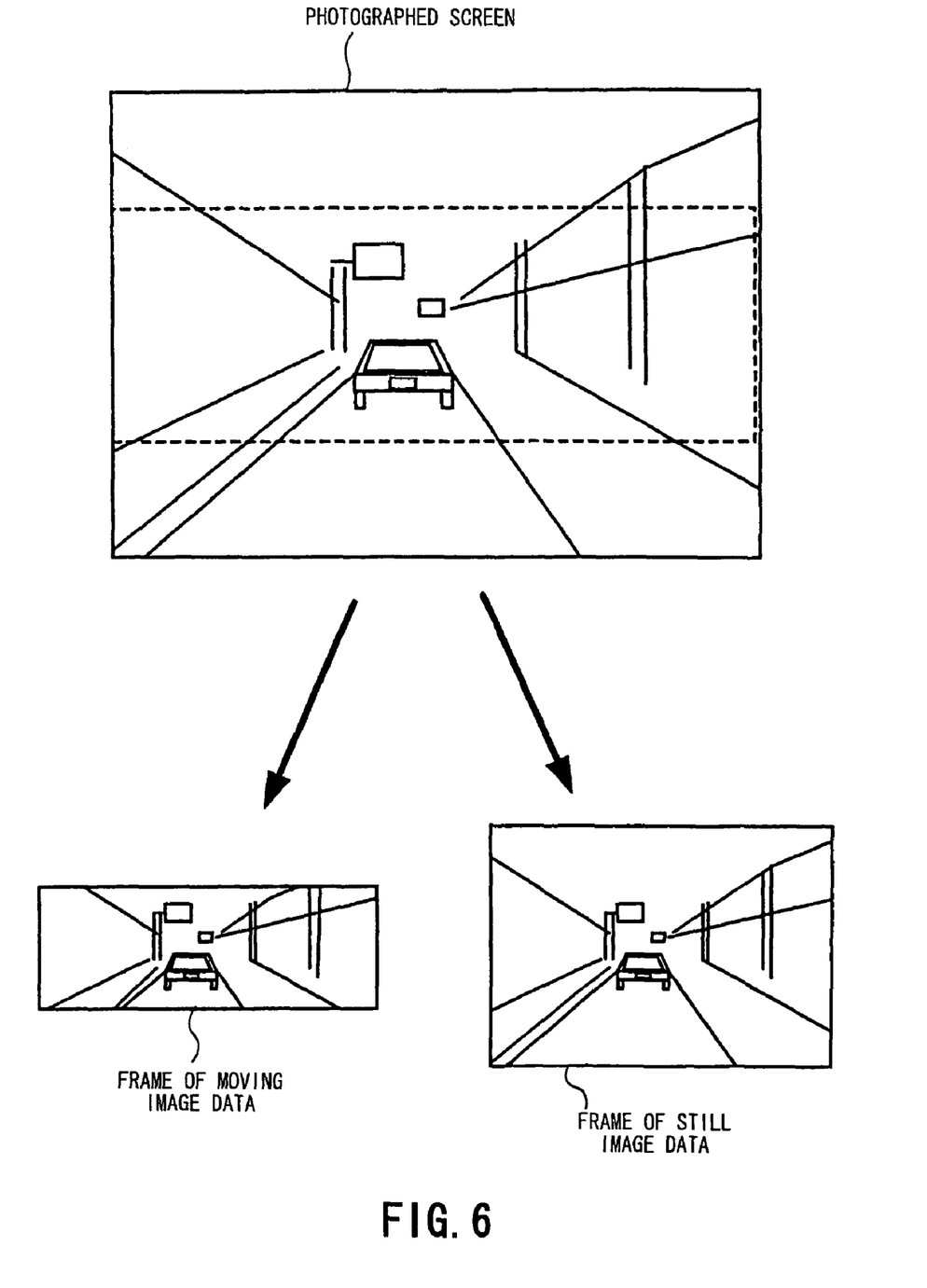
FIG. 6 is an explanatory diagram showing a moving image photographing area in the drive recorder camera.

(3) The CPU 23 changes an aspect ratio between moving image data and still image data and sets an image size of moving image data to be smaller than that of still image data. For example, the CPU 23 may read out partially a image signal of a central part of the image pickup device 12 in the horizontal direction, and photographs a moving image in a landscape image, an upper and lower part of which are cut off (refer to FIG. 6). Even with moving image data by the above setting, a situation around the car before and after an accident can be grasped sufficiently and any problems will not occur. On the other hand, a faster signal reading from the image pickup device 12 by the partial readout and suppression of a computational load on the image processing section 15 are realized. Also, since a data amount of moving image data becomes smaller, it becomes possible to make longer a recording time of moving image data.

Step S103: The CPU 23 determines whether an accident has occurred to the car, based on input signals from the switch group of the car or a signal from the swing sensor 33.

More specifically, the CPU 23 determines that an accident has occurred in cases: (1) the CPU 23 receives an explosion signal of an air bag of the car by a crash, (2) the CPU 23 receives an operation signal of an electric motor rewinding a seat belt at an crash, (3) the CPU 23 receives a crash detection signal from a crash detection sensor provided on such as a bumper or a bonnet hood of the car, and (4) a swing larger than a threshold value is detected in the swing sensor section 33.

Then, if an accident has occurred (YES), the process goes to S104. On the other hand, if an accident occurrence is not detected (NO), the process goes to S107.

Step S104: Here, the CPU 23 prohibits overwriting of moving image data recorded in the recording medium 26 and the built-in recording device 19 at the same time of an accident occurrence, and holds moving image data representing a situation before and after the accident. Here, the CPU 23 keeps generating moving image data continuously even until a predetermined time after the accident occurrence, and records moving image data representing a situation after the accident occurrence in the recording medium 26 and the built-in recording device 19.

Step S105: The CPU 23 photographs a still image at a predetermined timing after the accident occurrence and generates still image data. Then, the CPU 23 records the still image data in the recording medium 26 and the built-in recording device 19.

Figure 7:
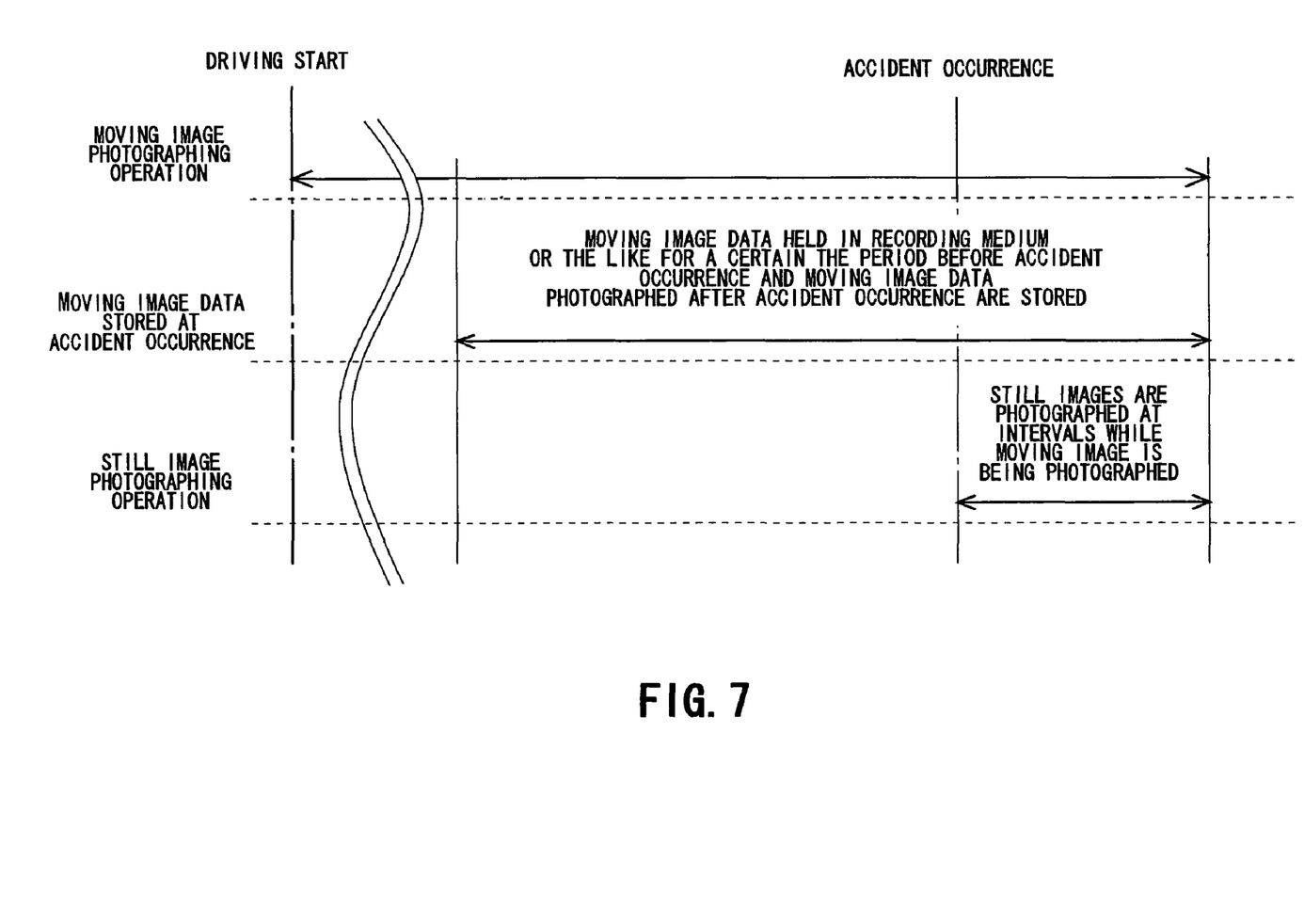
FIG. 7 is a timing chart of still image photographing in the first embodiment.

FIG. 7 is a timing chart of photographing a still image in the first embodiment. In the first embodiment, the CPU 23 carries out photographing a still image in multiple times at intervals, while photographing a moving image just after an accident occurrence. In photographing a still image, a bracketing photography may be carried out by changing exposure conditions for each frame (shutter speed (second), ISO sensitivity and the like). Here, the CPU 23 stops generating frames of moving image data temporarily during photographing still images and interpolates the moving image data during photographing the still images with frames just before starting the still image photographing. Thereby, it is possible to generate moving image data, from which a situation at the accident occurrence can be sufficiently grasped, though a motion of an object is slightly awkward during the still image photographing.

Here, the above described still image data is generated for the purpose of analyzing a picture at an accident in detail, and a clear image with a higher resolution and a higher gradation level and an image photographing of a wider area than a frame of a moving image are required. Therefore, the CPU 23 carries out photographing by changing at least one of settings for a resolution, a gradation number and an aspect ratio of the above mentioned still image data from those of moving image data, and by setting an information amount per frame of the still image data to be larger than that of moving image data. For example, in an example of S102, the CPU 23 reads out an image signal of all the pixels from the image pickup device 12 in the still image photographing, and generates color still image data of 1,600×1,200 pixels with eight bits for each R, G, and B.

Also, still image data, in which a photographed object is blurred, is treated as an image of failed photography which can not be used for an accident analysis. Therefore, the CPU 23 preferably carries out the blur compensation by swinging the optical axis correction lens 32 in the still image photographing. Further, the CPU 23 preferably suppresses a blur occurrence by limiting an exposure time not more than a predetermined time (e.g., 1/60 second) in the still image photographing. Here, in a case where exposure becomes insufficient by limiting the exposure time, the CPU 23 preferably compensates image sensitivity by adjusting a gain in the analog signal processing section 13 or the image processing section 15. In this case, it is possible to obtain a relatively fine still image, while an S/N ratio is slightly degraded.

Further, in the still image photographing, the CPU 23 generates additional data representing which frame of moving image data each still image data corresponds to. This additional data is recorded in association with the still image data. For example, in a case where the still image data complies with the Exif (Exchangeable image file format for digital still cameras) Standard, the above mentioned additional data may be recorded on the MakerNote tag of the still image data.

Step S106: The CPU 23 performs an "encoding process" or an "embedding process of a digital watermark data" on the moving image data (S104) and the still image data (S105) representing situations before and after the accident occurrence recorded in the built-in recording device 19. Then, the CPU 23 ends photographing operation.

Step S107: The CPU 23 determines whether a photographic condition for driving situation image data is met (e.g., whether a predetermined time has elapsed from a previous generation of driving situation image data). If the photographic condition is met (YES), the process goes to S108. On the other hand, if the photographic condition is not met (NO), the process goes to S109.

Step S108: The CPU 23 drives the image pickup device 12 to photograph an image of a viewing field ahead of a driver's seat to generate driving situation image data. Here, the driving situation image data is not required to have such a high image quality because the purpose of the driving situation image data is to grasp a general car driving situation. Therefore, the CPU 23 may use a frame extracted from moving image data for the driving situation image data. Then, the CPU 23 records the driving situation image data only in the recording medium 26.

Step S109: The CPU 23 determines whether there is an instruction to end photographing by a user's input or the like. If there is an instruction to end photographing (YES), the CPU 23 ends photographing. On the other hand, if there is not an instruction to end photographing (NO), the process returns to S102 and the CPU 23 repeats the above operations. The description of the operation in the first embodiment ends as above.

In the drive recorder camera 10 according to the first embodiment, at an accident occurrence, moving image data before and after the accident occurrence is recorded and also multiple frames of still image data are photographed more clearly in detail than the moving image data. Therefore, it is possible generally to grasp a process until the accident occurrence by the moving image data, and also it is possible to analyze a detailed situation at the accident using the still image data.

Also, since still image data are respectively associated with frames of moving image data by additional data, an analysis of an accident situation using the both moving image data and still image data can be performed more easily. Further, when still image data is generated with a bracketing photography, there will be a higher probability that still image data is obtained with a clear image photographed with an appropriate exposure.

Also, in the first embodiment, accident image data which photographed the same accident situation are recorded in each of the recording medium 26 and the built-in recording device 19. Therefore, if one set of the accident image data is lost, a situation at the accident can be analyzed using the other set of the accident image data, resulting in improvement of data maintainability.

Further, in the first embodiment, on accident image data in the built-in recording device 19 is performed an "encoding process" or an "embedding process of a digital watermark data". At the same time, access to accident image data in the built-in recording device 19 is limited only for a specific person with a password input or the like. Therefore, accident image data in the built-in recording device 19 has an extremely low probability to be altered and has a high credibility as evidence of an accident situation. On the other hand, accident image data in the recording medium 26 is easily reproduced by a computer or the like and a driver is not hindered personally to confirm contents thereof.

Also, in the first embodiment, it is possible to perform labor management of a driver using driving situation image data recorded in the recording medium 26, and a convenient feature as a product may be improved.

Note that, in the first embodiment, a user can photograph a still image manually using the release button 22b. In this case, the CPU 23 generates still image data by performing an AE calculation based on an image signal for a whole screen as in a usual electronic camera. Thereby, a user can photograph a still image additionally as needed at an accident, and analysis of an accident situation can be done more easily. Also, the drive recorder camera 10 may be utilized for photographing a landscape during driving, and convenient and entertaining features as a product are improved.

Description of a Second Embodiment

Figure 8:
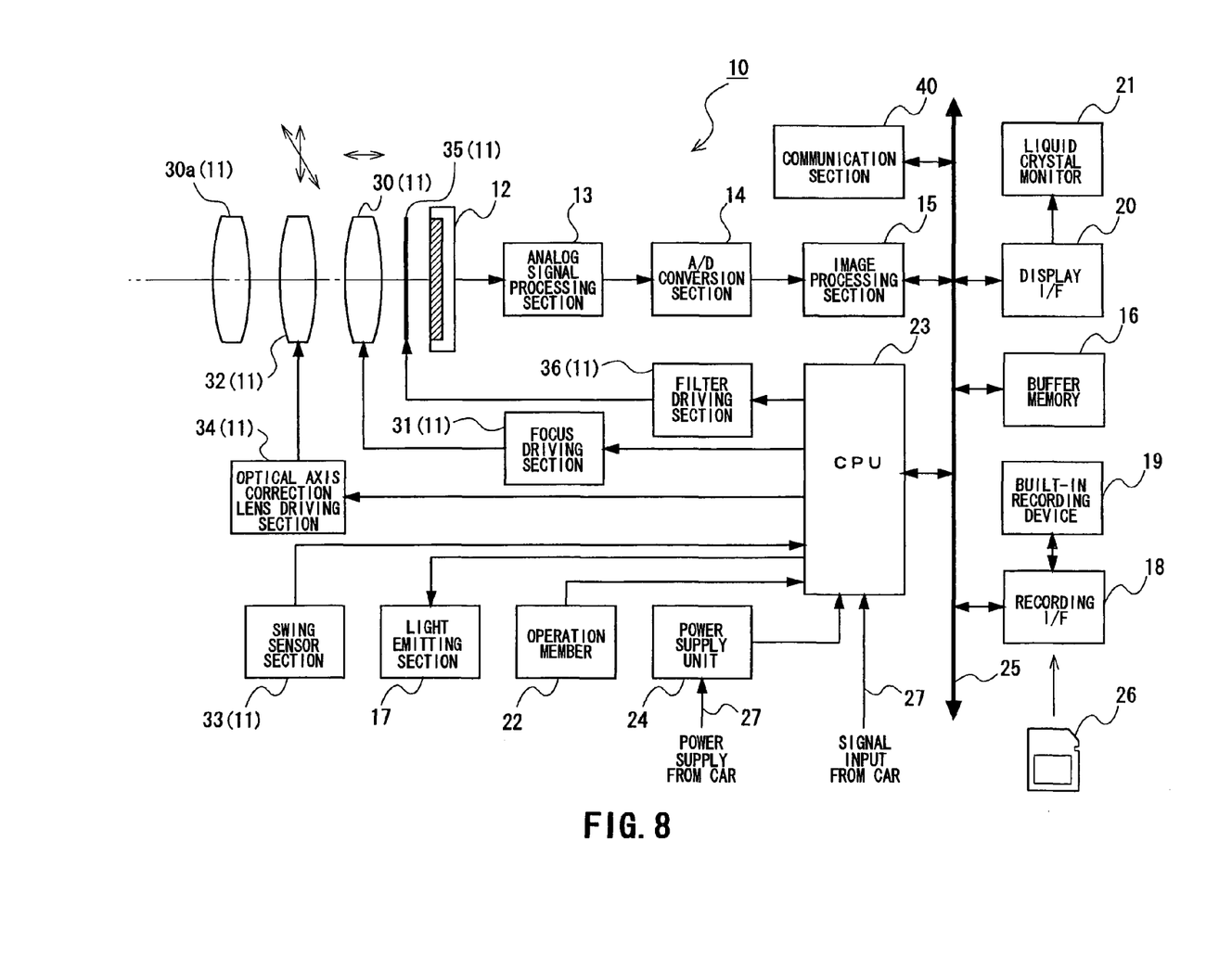
FIG. 8 is a block diagram showing a configuration of a drive recorder camera according to a second embodiment.

FIG. 8 is a block diagram showing a configuration of a drive recorder camera according to a second embodiment. Note that common constituents in the following embodiments and in the first embodiment are denoted by the same symbols and redundant descriptions will be omitted.

The second embodiment is a variation of the first embodiment, and the data bus 25 is further connected to a communication section 40. The communication section 40 transmits accident image data to an accident image management server which is managed by a public organization, an insurance company, or the like using a publicly known radio communication channel (e.g., communication channel between a mobile phone and each base station).

Figure 9:
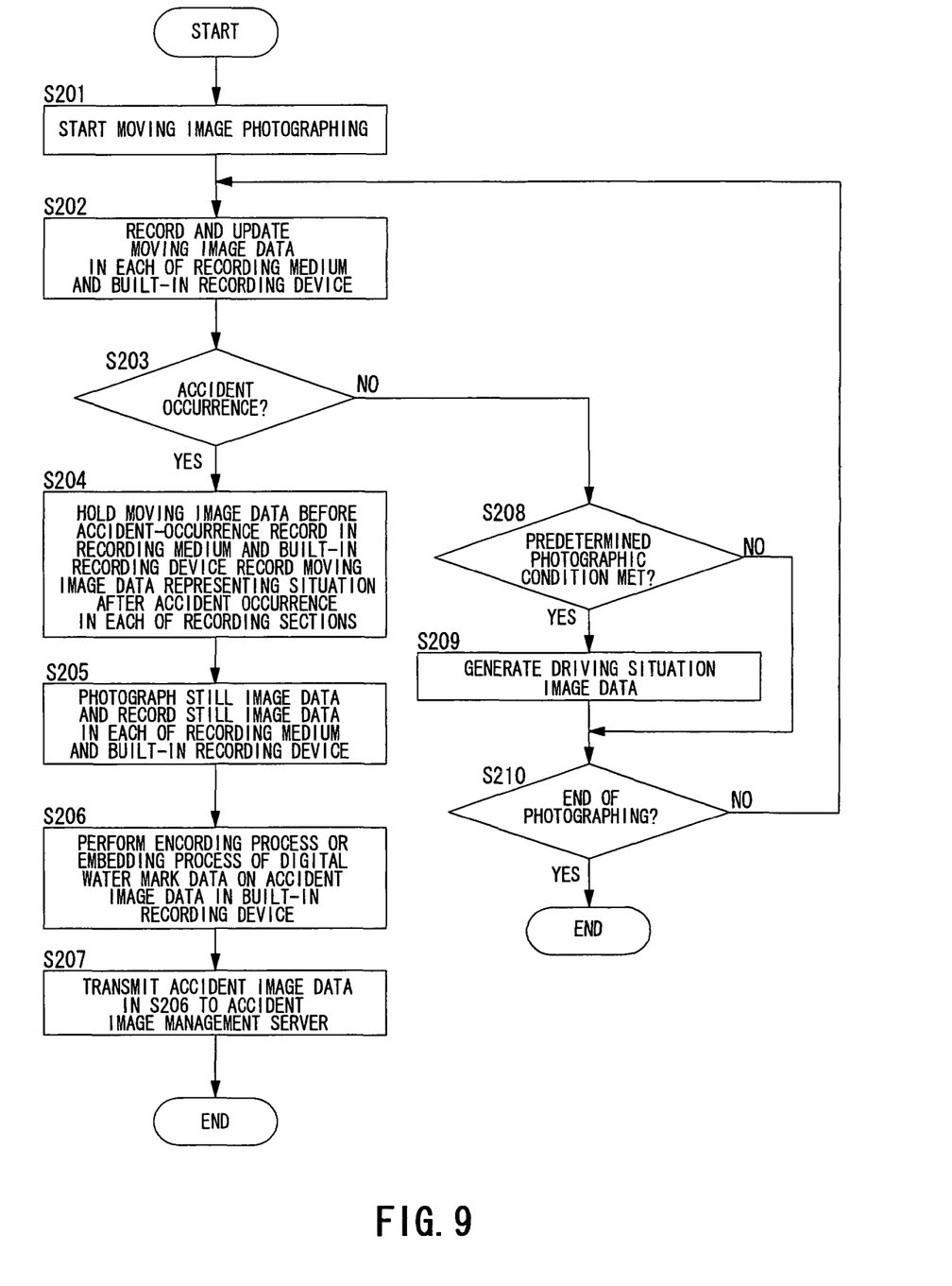
FIG. 9 is a flow chart showing an operation of the drive recorder camera according to the second embodiment.

FIG. 9 is a flow chart showing an operation of the drive recorder camera according to the second embodiment. Here, S201 to S205 in FIGS. 9 correspond to S101 to S105 in FIG. 5, and S208 to S210 in FIG. 9 correspond to S107 to S109 in FIG. 5, respectively and description thereof will be omitted.

Step S206: The CPU 23 performs an "encoding process" or an "embedding process of a digital watermark data" on the moving image data (S204) and the still image data (S205) representing situations before and after the accident occurrence recorded in the built-in recording device 19.

Step S207: The communication section 40 transmits the moving image data and the still image data after the processing in S206 to an accident image management server, which is managed by a public organization or the like, by an instruction of the CPU 23. Then, the CPU 23 ends the operation after finishing the data transmission. Here, in a case communication with the server is not established in a certain time, the CPU 23 may try to carry out a data transmission operation again in S207 after a predetermined time. Alternatively, The CPU 23 may end the operation without any action, since the accident image data after the processing in S206 is recorded in the built-in recording device 19.

The second embodiment can provide an effect similar to that of the first embodiment and accident image data with a high credibility is recorded in an accident image management server which is managed by a public organization or the like, resulting in more secure integrity of accident data.

(Supplement to the Embodiments)

Hereinabove, the present invention has been described according to the foregoing embodiments, but the technological scope of the present invention is not limited to those of the foregoing embodiments and may include the following configuration, for example.

(1) In the foregoing embodiments, a drive recorder system may be configured such that the CPU 23 may record driving information of a car obtained via a cable in association with accident image data. For example, the CPU 23 obtains various kinds of driving information (car speed, acceleration, braking pressure, a steering wheel angle, positional information from the GPS, etc.) from a car side, and holds the information for a certain time period in a recording medium of a drive recorder camera. Then, the CPU 23 generates accident recording data at an accident occurrence associating the driving information before and after the accident occurrence with the accident image data. Thereby, it becomes possible to analyze an accident situation of a car in more detail.

Figure 10:
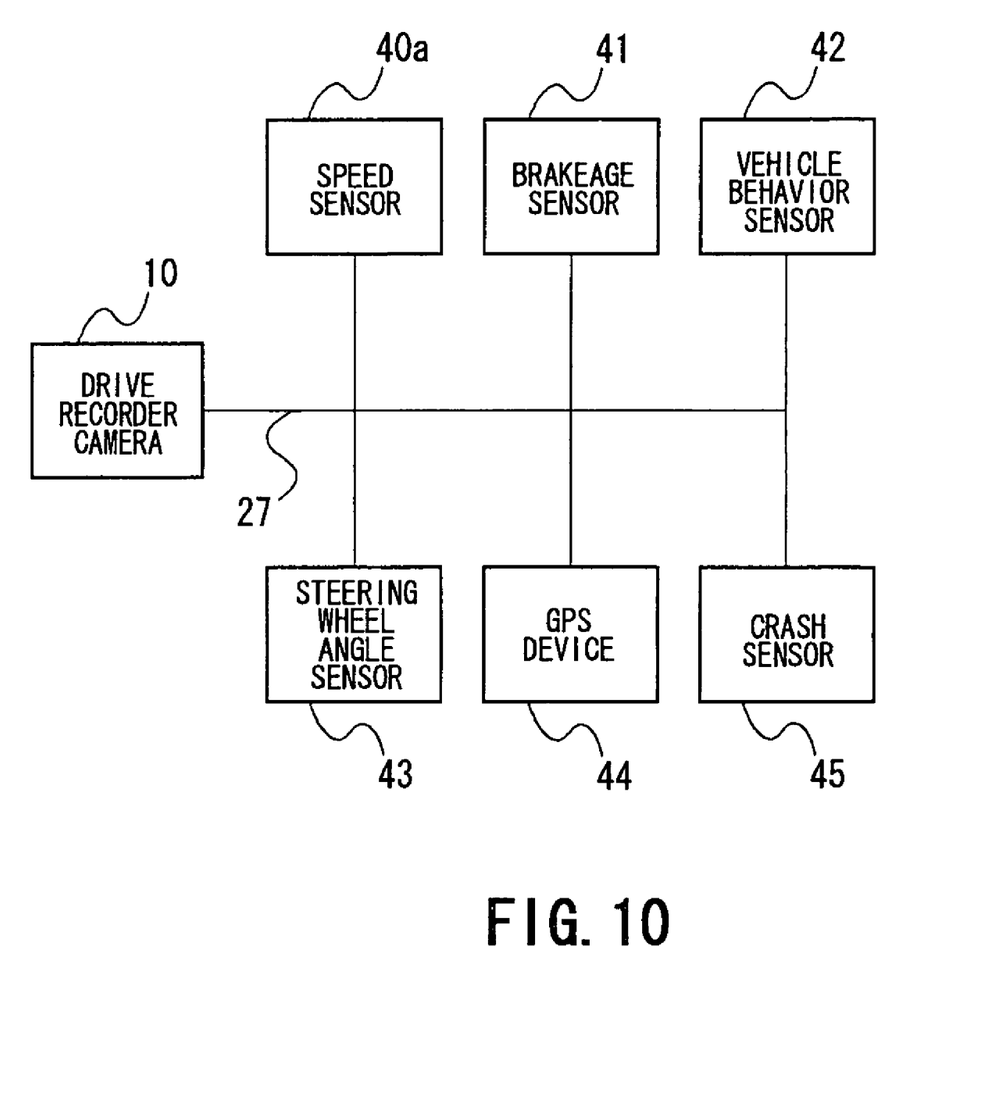
FIG. 10 is a block diagram showing an example of a drive recorder system.

Here, FIG. 10 is a block diagram showing an example of a drive recorder system. A drive recorder camera 10 is connected with each sensor on the vehicle side via a cable 27. The sensors on the vehicle side include a speed sensor 40a, brakeage sensor 41, a vehicle behavior sensor 42, a steering wheel angle sensor 43, a GPS device 44, and a crash sensor 45. The speed sensor 40a outputs car speed and acceleration to the drive recorder camera 10. The brakeage sensor 41 outputs data indicating a state of a braking to the drive recorder camera 10. This brakeage sensor 41 may detect an operating state of an ABS device of the vehicle or may detect a pressing force to a brake pedal via a brake link mechanism or the like, for example. The vehicle behavior sensor 42 is formed with a gyro sensor and outputs dynamic behavior data of rolling, pitching and yawing of the vehicle to the drive recorder camera 10. The steering wheel angle sensor 43 outputs a rotating state of a steering wheel to the drive recorder camera 10. The GPS device 44 outputs a present vehicle position based on radio waves form the GPS satellites to the drive recorder camera 10. The crash sensor 45 notifies the drive recorder camera 10 of an accident occurrence. Here, the crash sensor 45 may, for example, detect a shock to a bumper, a bonnet hood, etc. of the vehicle or detect air-bag explosion or operation of an electric motor rewinding a seat belt.

(2) In the present invention, some of the constituents may be omitted from the drive recorder camera 10 according to the foregoing embodiments. For example, by a setting of the photographic optical system 11 in a pan focus mode, the focus lens 30 and the focus driving section 31 may be omitted. Also, the driving mechanism (36) of the infra-red cut filter 35 and the blur compensation mechanism with the optical axis correction lens 32 may be omitted. Here, when the blur compensation mechanism is omitted, it is preferable to provide another swing sensor section 33 for the drive recorder camera 10 to detect a swing caused by a car crash.

(3) The blur compensation of the drive recorder camera 10 is not limited to a mechanical compensation detecting a swing of the optical axis correction lens and may have a configuration using an electronic blur compensation which cancels a blur by shifting a cut-out area of image data according to a swing of the image.

(4) A timing for still image photographing at an accident occurrence is not limited to those of the forgoing embodiments. For example, the CPU 23 carries out moving image photographing for a predetermined time just after an accident occurrence and may carry out still image photographing at one time after having finished the moving image photographing. Alternatively, the CPU 23 may be configured to start still image data generation preliminarily at a time of a sudden braking.

(5) In the forgoing embodiments, the recording I/F 18 may be configured to be provided with two connectors for connecting two recording media 26, and accident image data may be recorded in each of the two recording media. Also, the built-in recording device 19 may be configured to have logically divided recording regions, and accident image data may be recorded in each of the recording regions.

(6) Regarding unit which varies security levels of two sets of accident image data, all the means disclosed in the foregoing embodiments are not necessary to be carried out, but only some of the means in the foregoing embodiments may be carried out. For example, the present invention also includes a configuration in which accident image data provided with an encoding process or the like and accident image data to be reproduced by a driver are recorded in the same recording medium. Also, the present invention includes a configuration in which the same accident image data without an encoding process is recorded in each of one recording section with access limitation by a password input or the like and the other recording section without access limitation.

(7) In the present invention, settings of a resolution, a gradation number, a frame rate of moving image data, etc. may be not always the same for the two sets of accident image data. For example, in the foregoing embodiments, accident image data in the recording medium 26 may be set to have a lower image quality for driver's confirmation, while accident image data in the built-in recording device 19 is set to have a higher image quality.

(8) In the embodiment, the drive recorder camera may successively photograph a still image with a high resolution during driving.

For example, the CPU 23 starts photographing a still image with a high resolution triggered by a detection of engine start or wheel rotation, or by driver's boarding. Here, the CPU 23 sets a resolution of a still image higher than that of a moving image. In an example according to the foregoing embodiments, it is preferable to photograph a still image during driving with the same level of a resolution as that of a still image photographed at an accident occurrence.

Then, the CPU 23 photographs the still image at a certain interval in a normal situation and holds the image in the buffer memory 16. The number of frames stored in the buffer memory 16 increases more than a predetermined number, the CPU 23 erases the still images in order from oldest one and holds the still images for a certain time period in the buffer memory 16. For example, 50 frames of still images photographed at an interval of 0.1 second are recorded in the buffer memory 16.

When an accident has been detected, the CPU 23 prohibits erasing of still image data in the buffer memory 16. Then, the CPU 23 transfers a set of still images stored in the buffer memory 16 representing situations before and after the accident occurrence to the built-in recording device 19 or the recording medium 26. Here, it is possible to grasp easily situations before and after the accident using still images with a high resolution photographed successively.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An imaging apparatus mounted on a vehicle and imaging a vicinity of said vehicle, comprising:
   a photographic lens;
   an image pickup device generating an image signal by performing photoelectric conversion of an object image based on a light flux from said photographic lens;
   an accident detection sensor detecting an accident occurrence based on a shock to said vehicle;
   an image processing section generating first accident image data and second accident image data, which photograph a same accident situation at an accident occurrence, based on said image signal; and
   a recording section recording said first accident image data and said second accident image data in different states of security levels regarding data credibility, respectively.

2. The imaging apparatus according to claim 1, wherein said image processing section performs either one of an encoding process and an embedding process of a digital watermark data, on said first accident image data.

3. The imaging apparatus according to claim 1, wherein said recording section includes: a first recording section recording said first accident image data in a setting to limit access from persons except for a specific person; and a second recording section logically and physically separated from said first recording section and recording said second accident image data in a setting with an access limitation relaxed from that of said first recording section.

4. The imaging apparatus according to claim 3, wherein said first recording section is fixed in said imaging apparatus and said second recording section is detachably connected to said imaging apparatus.

5. The imaging apparatus according to claim 3, wherein said image processing section generates driving situation image data photographing a scene outside said vehicle under a predetermined condition, and records said driving situation image data in said second recording section.

6. The imaging apparatus according to claim 1, further comprising a communication section transmitting to outside one accident image data with said security level set higher, out of said first accident image data and said second accident image data.

7. A drive recorder system comprising:

an imaging apparatus according to claim 1; and a driving state detecting section detecting a driving state of said vehicle and recording a driving state data representing said driving state in said recording section in association with at least one of said first accident image data and said second accident image data.

* * * * *